United States Patent [19]
Miki et al.

[11] Patent Number: 4,459,879
[45] Date of Patent: Jul. 17, 1984

[54] TORQUE RATIO CONTROL DEVICE FOR A V-BELT TYPE CONTINUOUSLY VARIABLE TRANSMISSION FOR VEHICLES

[76] Inventors: Nobuaki Miki, No. 3-47 Okino, Noda-cho, Kariya, Aichi Prefecture; Shoji Yokoyama, No. 1 Nakata, Kawashima-cho, Anjo, Aichi Prefecture, both of Japan

[21] Appl. No.: 247,063

[22] Filed: Mar. 24, 1981

[30] Foreign Application Priority Data

Mar. 24, 1980 [JP] Japan .................................. 55-37260

[51] Int. Cl.³ .............................................. A60K 41/12
[52] U.S. Cl. ...................................... 74/867; 74/870; 74/862; 74/866; 474/12; 474/28; 474/18
[58] Field of Search ............... 74/866, 867, 856, 861, 74/862, 863, 864, 865, 870; 474/11, 12, 17, 18, 28

[56] References Cited

U.S. PATENT DOCUMENTS

| | | | |
|---|---|---|---|
| 3,044,316 | 7/1962 | Forster | 74/862 |
| 3,750,495 | 8/1973 | Ito et al. | 74/866 |
| 3,918,312 | 11/1975 | Espenschied et al. | 74/866 |
| 4,131,035 | 12/1978 | Mizuno et al. | 74/866 |
| 4,152,947 | 5/1979 | van Deursen et al. | 474/11 |
| 4,161,894 | 7/1979 | Giacosa | 474/12 |
| 4,228,691 | 10/1980 | Smirl | 474/12 |
| 4,241,618 | 12/1980 | Smirl | 74/863 |
| 4,308,764 | 1/1982 | Kawamoto et al. | 74/866 |

FOREIGN PATENT DOCUMENTS 0989227 4/1965 United Kingdom ................ 74/863

Primary Examiner—Allan D. Herrmann
Assistant Examiner—Joseph M. Rolnicki
Attorney, Agent, or Firm—Cooper, Dunham, Clark, Griffin & Moran

[57] ABSTRACT

In a V-belt type continuously variable transmission for vehicles, the line pressure is supplied to a hydraulic servo system of the output pulley, while the pressure to a hydraulic servo system of the input pulley is regulated by a torque ratio control device. The torque ratio control device of the invention comprises an electric control circuit receiving input signals of the vehicle running conditions such as the throttle opening, the vehicle speed or the input pulley revolution speed and generating output signals to control the effective diameter of the input pulley, two electromagnetic solenoid valves controlled by the output signals of the electric control circuit, and a torque ratio control valve controlled by the two solenoid valves and regulating the hydraulic pressure supplied to the hydraulic servo system of the input pulley. The output hydraulic pressure of the torque ratio control device is supplied to the hydraulic servo system of the input pulley thereby continuously variable shifting is effected.

6 Claims, 34 Drawing Figures

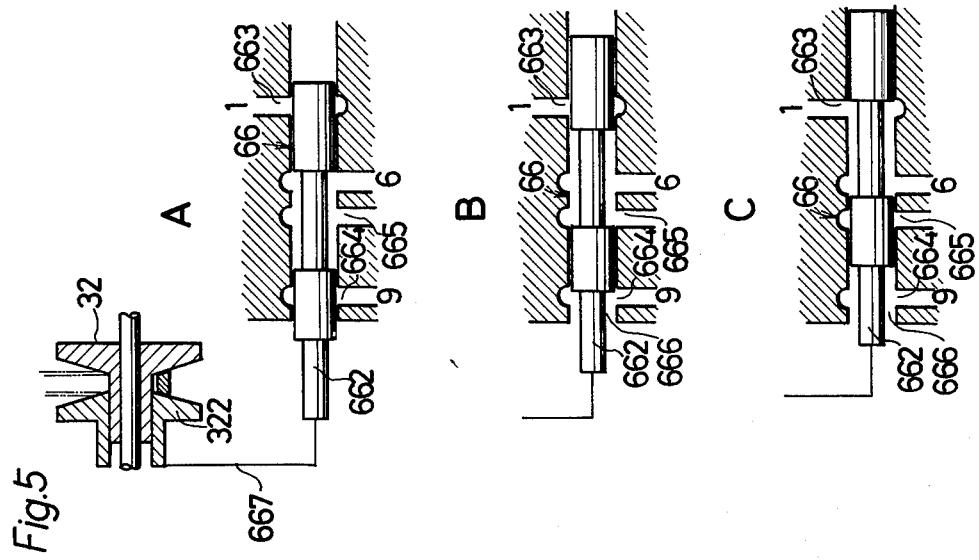
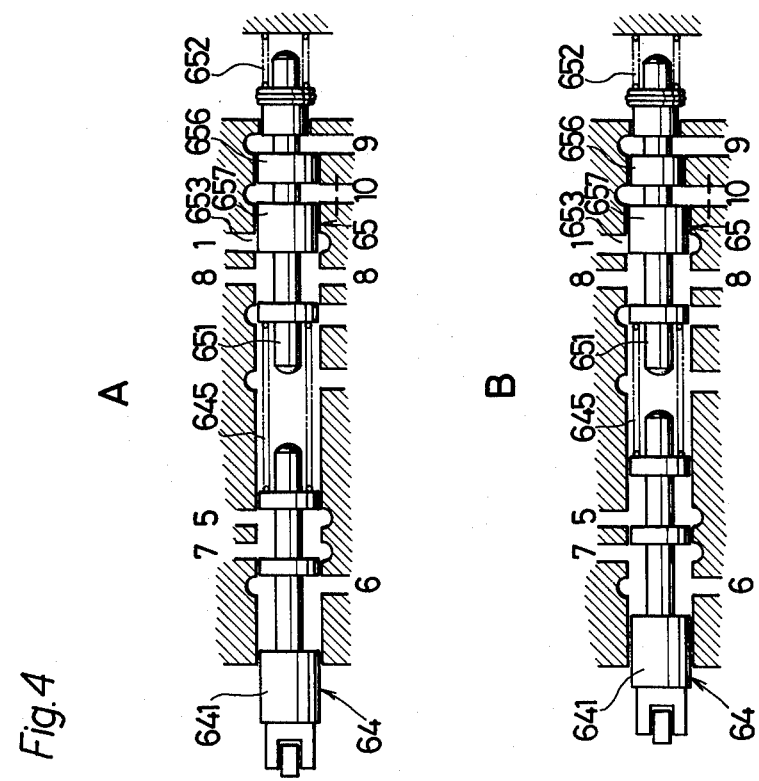

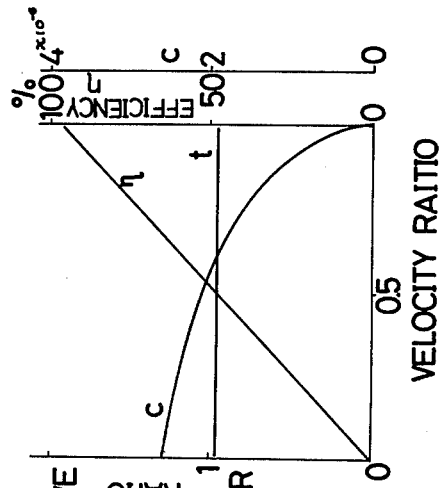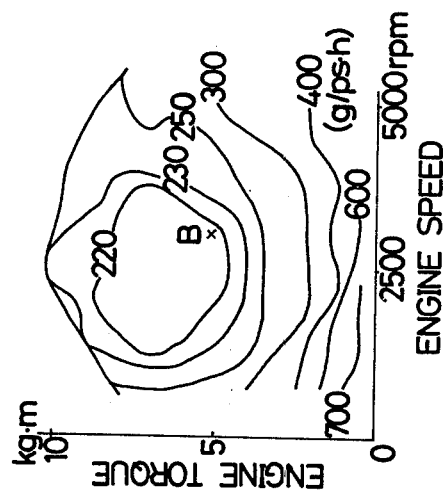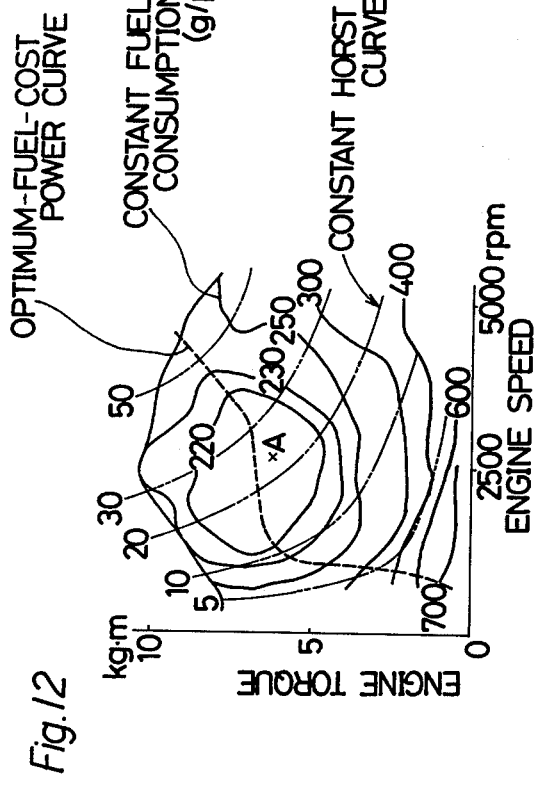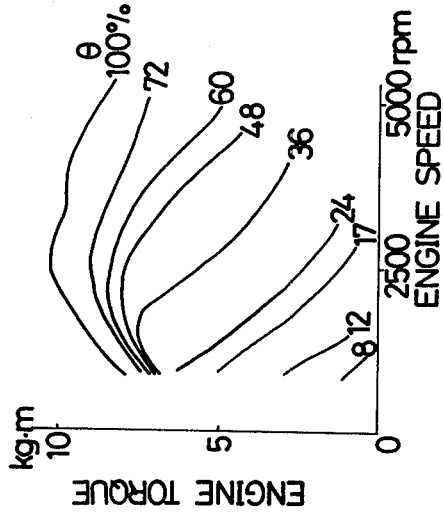

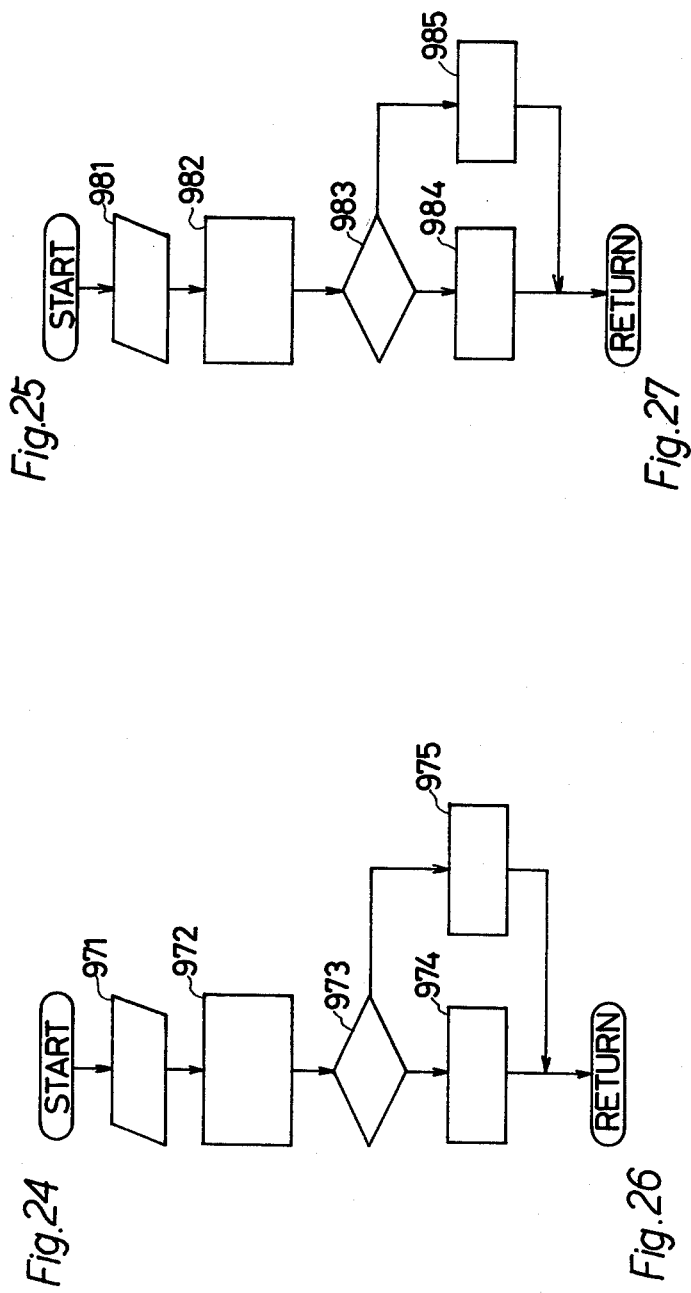

TORQUE RATIO CONTROL DEVICE FOR A V-BELT TYPE CONTINUOUSLY VARIABLE TRANSMISSION FOR VEHICLES

BACKGROUND OF THE INVENTION

1. Field of the Invention

The present invention relates to an automatic transmission for vehicles using a V-belt type continuously variable transmission, and more particularly to a torque ratio control device adjusting continuously a V-belt type continuously variable transmission in response to input signals.

2. Description of the Prior Art

A V-belt type continuously variable transmission can be used in combination with a planetary gear set for changing forward and reverse drives as an automatic transmission for vehicles such as automobiles. The automatic transmission is controlled by an automatic control device comprises an electric control circuit receiving input signals of working conditions such as the carburetor throttle opening, the vehicle speed, the input pulley revolution speed, and the shift lever setting position, and a hydraulic control circuit for regulating the reduction ratio between input and output shafts and changing the forward and reverse drives in the planetary gear set. The hydraulic control circuit comprises a manual lever operated by a shift lever near the driver's seat, a throttle valve associated with the throttle opening, a regulator valve regulating the hydraulic fluid pressure from the hydraulic source and providing it as the line pressure, a torque control device controlling the input pulley and regulating the reduction ratio between the input and output shafts, and a shift control mechanism performing the N-D shift and N-R shift and eliminating shock during the shift operation.

SUMMARY OF THE INVENTION

An object of the present invention is to provide a torque ratio control device in a V-belt type continuously variable transmission for vehicles wherein the input pulley is controlled smoothly.

Another object of the present invention is to provide a torque ratio control device of compact structure.

Another object of the present invention is to provide a torque ratio control device wherein the reduction ratio between the input and output pulleys may be decreased at upshift drive by supplying the line pressure to the hydraulic servo systems of the output pulley and the input pulley wherein the pressure receiving area of the hydraulic servo system of the input pulley is twice as large as that of the output pulley, thus increasing the pushing force on the input pulley.

Another object of the present invention is to provide a torque ratio control device wherein the reduction ratio between the input and output pulleys may be increased at downshift by communicating the passage leading to the hydraulic servo system of the input with a drain passage, and thus decreasing the pushing force in the hydraulic servo system of the input pulley.

Another object of the present invention is to provide a torque ratio control device wherein slippage between the belt and the pulley is prevented under all working condition by supplying the line pressure to the hydraulic servo system of the output pulley and applying this large pushing force to the V-belt.

Another object of the present invention is to provide a torque ratio control device wherein when the reduction ratio between both pulleys is to be held constant the passage leading to the hydraulic servo system of the input pulley is sealed to prevent volume variation.

Another object of the present invention is to provide a torque ratio control device wherein oil leakage in any portion of the passage leading to the hydraulic servo system of the input pulley is compensated for and unwanted variation of the torque ratio caused by oil leakage is eliminated.

Another object of the present invention is to provide a torque ratio control device comprising two solenoids and one ratio control valve wherein the ratio control valve may be set to any of three positions for upshift, downshift and no-shift by a combination of ON-OFF states of two solenoids.

Another object of the present invention is to provide a torque ratio control device wherein compactness and long life of the solenoid valve are improved by supplying the line pressure through an orifice to the solenoid valve and reducing the amount of fluid controlled by the solenoid valve.

Another object of the present invention is to provide a torque ratio control device wherein the ratio control valve can be balanced at an intermediate position by providing a spring on one side of the valve and an exhaust port on the spring side of the valve.

Another object of the present invention is to provide a torque ratio control device wherein the ratio control valve can be stabilized at a balanced intermediate position by providing a beveled portion at the spring side of the valve.

Another object of the present invention is to provide a torque ratio control device wherein the ratio control valve can be stabilized at a balanced intermediate position by supplying the line pressure through an orifice to the spring side of the valve.

BRIEF DESCRIPTION OF THE DRAWINGS

FIG. 3 is a diagram illustrating operation of a manual valve;

FIG. 4 A, B is a diagram illustrating operation of a detent valve and a throttle valve;

FIG. 5 A, B, C is a diagram illustrating operation of a torque ratio valve;

FIG. 12 is a graph showing an optimum-fuel cost power curve for an engine;

FIG. 13 is a graph showing characteristics of engine output;

FIG. 14 is a graph showing the performance curve of a fluid delivery mechanism;

FIG. 15 is a graph showing constant fuel cost curves;

FIGS. 18, 19, 22, 23, 24 and 25 are program flowcharts illustrating operation of an electric control circuit;

FIG. 26 is a graph showing prescribed acceleration as a function of velocity;

FIG. 27 is a graph showing prescribed torque ratio as a function of velocity;

DESCRIPTION OF THE PREFERRED EMBODIMENTS

A torque ratio control device in a V-belt type continuously variable transmission for vehicles according to the present invention, comprises input and output pulleys mounted respectively on input and output shafts and having variable effective diameters, and a driving band drivingly connected between the input and output pulleys, the effective diameter of each pulley being adjusted by hydraulic pressure supplied to hydraulic servo systems associated with each pulley for the continuously variable control of the reduction ratio between the input and ouput shafts, wherein the torque ratio control device comprises an electric control circuit receiving input signals of vehicle running conditions such as the throttle opening, the vehicle speed or the input pulley revolution speed and generating output signals to control the effective diameter of the input pulley, two solenoid valves controlled by the output signals from said control circuit, and a torque ratio control valve controlled by said solenoid valves and regulating the hydraulic pressure supplied to the hydraulic servo system of the input pulley, wherein the hydraulic servo system of the output pulley is normally supplied with the line pressure and the hydraulic pressure supplied to the servo system of the input pulley is regulated depending on the vehicle running conditions, thereby controlling the torque ratio continuously.

The present invention will now be described in more detail with reference to preferred embodiments thereof shown in the accompanying drawings.

Figure 1:
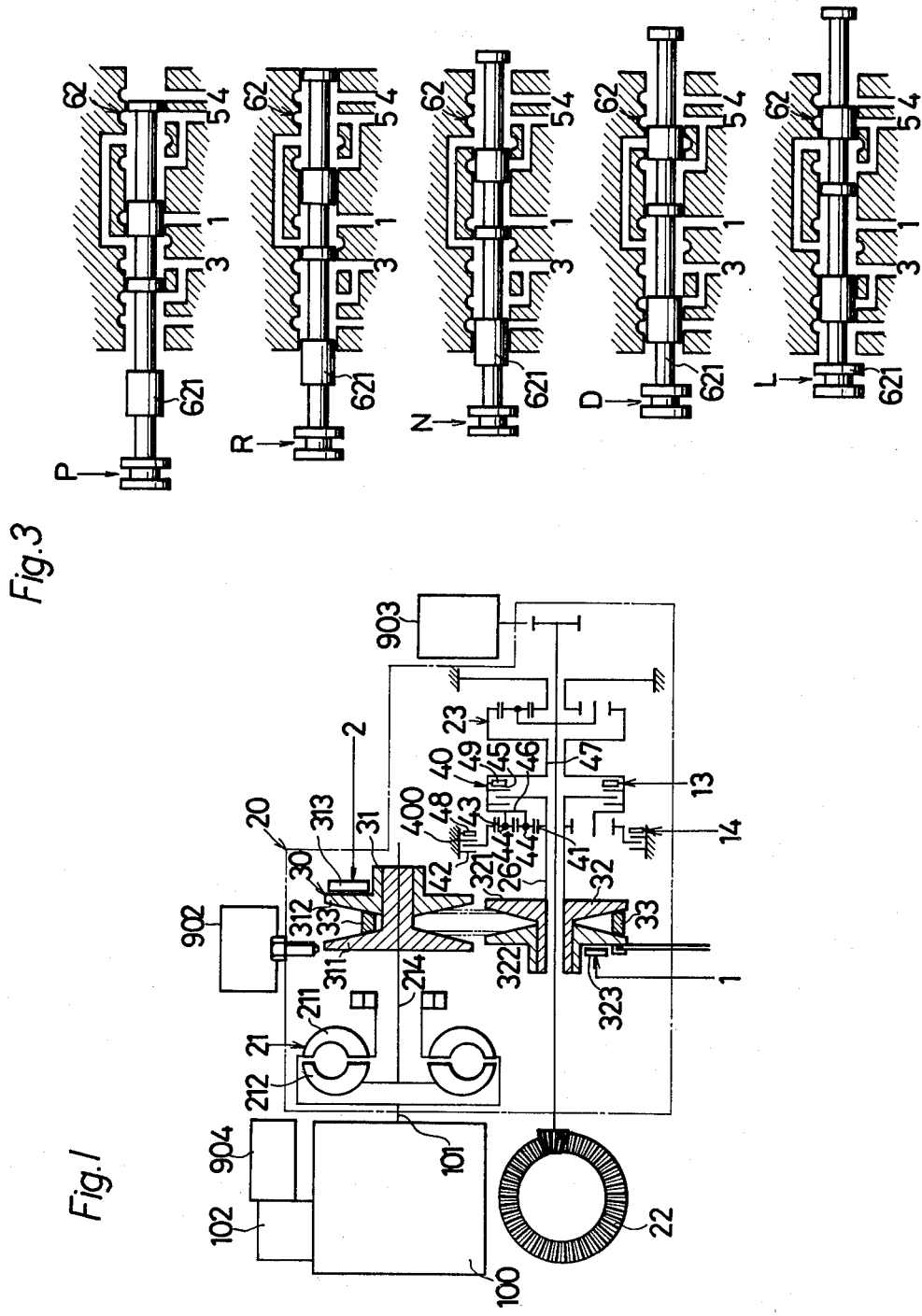
FIG. 1 is a schematic representation of a continuously variable transmission for vehicles.

FIG. 1 is a schematic representation of a stepless transmission apparatus for vehicles using a V-belt type continuously variable transmission. In the figure, numeral 100 designates an engine, 102 a carburetor, and 20 a transmission disposed between the engine 100 and the driving axle. The transmission 20 comprises a fluid coupling 21 connected to an engine output shaft 101, a reduction gear mechanism 23 connected to a differential gear 22, and a continuously variable transmission unit comprising a V-belt type continuously variable transmission 30 and a planetay gear set 40 for changing forward and reverse drives.

The fluid coupling 21 is that of a known type comprising a pump impeller 211 and a turbine runner 212 connected to a torque converter output shaft 214. In place of the fluid coupling, other fluid type torque converter or a mechanical clutch may be used.

The V-belt type continuously variable transmission 30 is that of a known type comprising an input pulley 31 comprising a stationary flange 311 connected to the fluid coupling output shaft 214 as the input shaft of the continuously variable transmission 30, a movable flange 312 opposite to the stationary flange 311, said shafts forming a V-shaped space, and a hydraulic servo system 313 driving the movable flange 312; an output pulley 32 comprising a stationary flange 321 connected to an intermediate shaft 26 as the output shaft of the continuously variable transmission 30, a movable flange 322 opposite to the stationary flange 321, said shafts forming a V-shaped space, and a hydraulic servo system 323 driving the movable flange 322; and a V-belt 33 connecting the input pulley 31 with the output pulley 32. The amount of displacement L of the movable flanges 312 and 322 at the input and output shafts 31 and 32 determines the torque ratio between input and output shafts. L varies over the range $0\text{-}l_2\text{-}l_3\text{-}l_4$ ($0 < l_2 < l_3 < l_4$) so that the torque ratio T between the input shaft 214 and the output shaft 26 of the continuously variable transmission 30 is continuously varied in the range of $t_1\text{-}t_2\text{-}t_3\text{-}t_4$ ($t_1 < t_2 < t_3 < t_4$). Since the pressure receiving area of the input hydraulic servo system 313 is about twice as large as that of the output hydraulic servo system 323 in this embodiment, the input movable flange 312 is subjected to a larger driving force than the output movable flange 322 even when the hydraulic pressure in the servo system 313 is less than or equal to that in the servo system 323. The enlarged pressure receiving area of the hydraulic servo system 313 may be attained by enlarging the diameter of the servo system or by using a piston having twice the receiving area in the servo system.

The planetary gear set 40 changing the forward and reverse drives comprises a sun gear 41 connected to the intermediate shaft 26 as the output shaft of the continuously variable transmission 30, a ring gear 43 engaged to a case 40 of the transmission unit through a multi-plate brake 42, a double planetary gear 44 rotatably meshed between the sun geat 41 and the ring gear 43, a planetary carrier 46 supporting the double gear 44 rotatably connected to the intermediate shaft 26 through a multi-plate clutch 45 and to a second intermediate shaft 47 as the output shaft of the planetary gear set 40, a hydraulic servo system 48 operating the multi-plate brake 42, and a hydraulic servo system 49 operating the multi-plate clutch 45. The planetary gear set 40 changing the forward and reverse drives provides a forward gear when the multi-plate clutch 45 is engaged and the multi-plate brake 42 is released, and provides a reverse gear with a reduction ratio of 1.02 when the clutch 45 is released and the brake 42 is engaged. The reduction ratio of 1.02 in the reverse drive is small in comparison to that in the usual transmission unit. In this embodiment, however, the reduction ratio obtained at the V-belt type continuously variable transmission, e.g. 2.4, and the reduction performance of the reduction gear mechanism 23, as hereinafter described, render a suitable reduction ratio.

The reduction gear mechanism 23 compensates for the low reduction ratio in the V-belt type continuously variable transmission 30 in comparison to the usual transmission unit, and provides a reduction ratio of 1.45 between input and output shafts to increase the torque.

The differential gear 22 is connected to the axle (not shown) and provides a final reduction ratio of 3.727:1.

Figure 2:
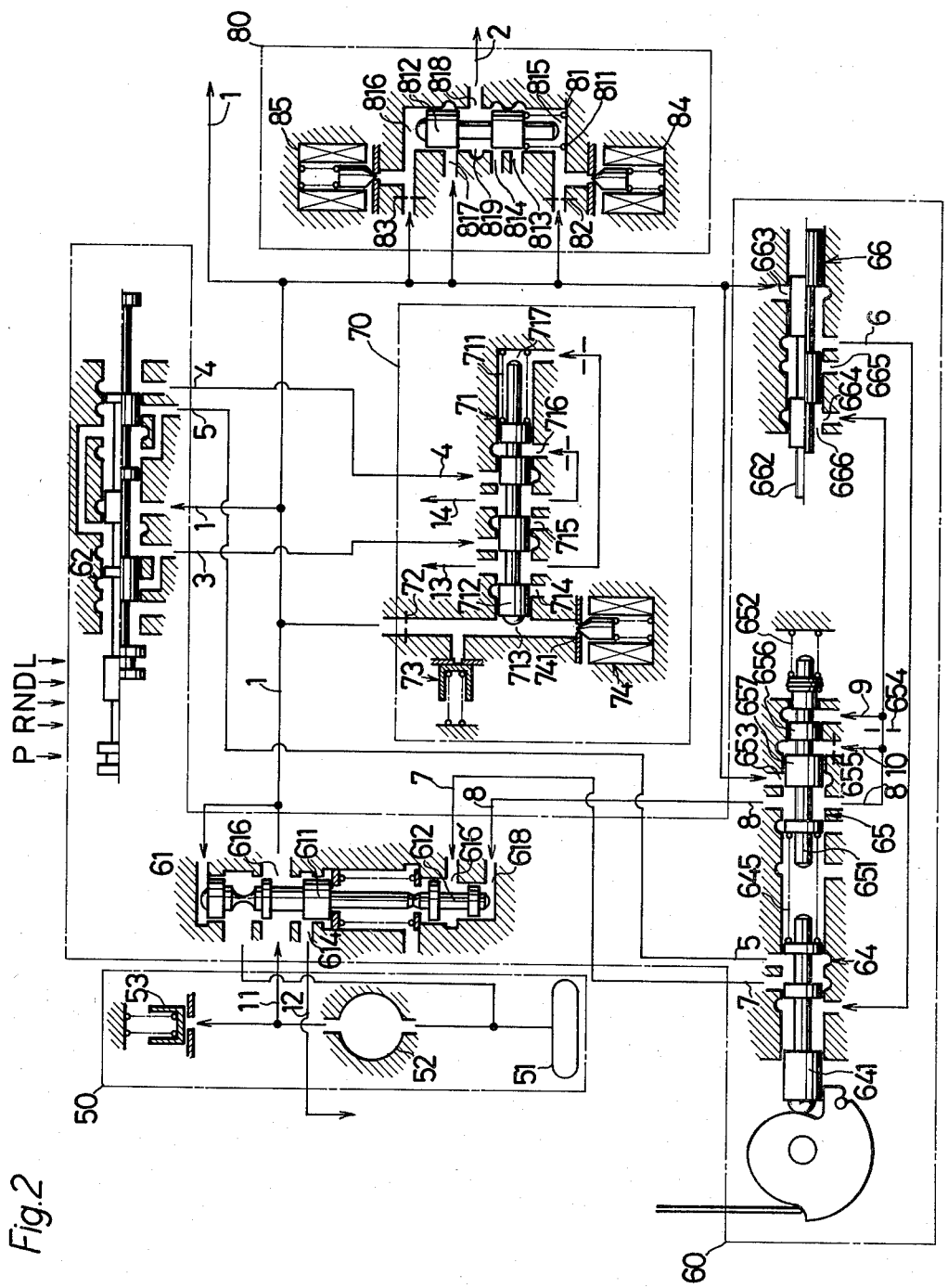
FIG. 2 is a diagram of a hydraulic control circuit of a continuously variable transmission.

FIG. 2 shows a hydraulic control circuit which controls the continuously variable transmission unit in the transmission of FIG. 1.

According to the present embodiment, the hydraulic control circuit comprises a hydraulic pressure source 50, a hydraulic regulator 60, a shift control mechanism 70 controlling the timing of engagement of the multi-plate brake and multi-plate clutch in the planetary gear set 40 and retarding the shock of the N-D and N-R shift, and a torque ratio control device 80.

The hydraulic regulator 60 comprises a manual valve 62 operated manually by a shift lever (not shown), a detent valve 64 and a throttle valve 65 providing respectively detent pressure and throttle pressure depending on the throttle opening $\theta$ of the carburetor 102, a torque ratio valve 66 interlocked with the movable flange 322 of the output pulley 32, said torque ratio valve 66 supplying the detent valve 64 with the line pressure and decreasing the pressure in an output hydraulic feedback passage 9 to the throttle valve 65 corresponding to the amount of displacement of the movable flange 321, and a regulator valve 61 regulating the hydraulic pressure supplied from the hydraulic pressure source 50 and supplying the line pressure to portions of the hydraulic regulator 60.

The hydraulic pressure source 50 supplies hydraulic oil pumped from an oil strainer 51 to the regulator valve 61 through passage 11. The hydraulic pressure source 50 uses a pump 52 driven by the engine and has a relief valve 53.

Referring to FIG. 3 showing manual valve 62, a spool 621 is set to positions P, R, N, D and L corresponding to the shift positions P, R, N, D and L of the shift lever manually selected by the driver. Thereby the manual valve 62 communicates the line pressure from passage 1 to output passages 3-5 as shown in Table 1.

TABLE 1

|  | P | R | N | D | L |
|---|---|---|---|---|---|
| passage 3 | X | X | X | 0 | 0 |
| passage 4 | X | 0 | X | X | X |
| passage 5 | X | 0 | X | X | 0 |

In Table 1, O designates communication of pressure from passage 1, and X designates no communication of pressure from passage 1 to passages 3–5.

Referring to FIG. 2, the regulator valve 61 is provided with a spool 611, and a regulator valve plunger 612 responsive to detent pressure and throttle pressure to control the spool 611. The area of the gap opening to output port 614 varies according to the displacement of the spool 611. The line pressure is supplied from an output port 616 to the passage 1. Hydraulic oil is supplied from the output port 614 through the passage 12 to a fluid coupling oil cooler and to other units which require lubrication.

The detent valve 64 is provided with a spool 641 linked to the throttle opening $\theta$ of the throttle valve of the carburetor 102 as shown in FIGS. 2 and 4. When $0 \leq \theta \leq \theta_1$, the passage 5 communicates with the detent pressure output passage 7 leading to input port 616' in the regulator valve 61 as shown in FIGS. 2 and 4A; when $\theta_1 < \theta \leq 100\%$, the passage 7 communicates with the passage 6 connecting the detent valve 64 to the torque ratio valve 66.

The throttle valve 65 is provided with a spool 651, one end of said spool being disposed in series with the spool 641 of the detent valve through a spring 645 and the other end thereof being connected to a spring 652. The spool 651 moves corresponding to variations of the throttle opening $\theta$ as transmitted through the spool 641 and the spring 645. The opening area of the port 653 leading to the passage 1 is thereby regulated and the throttle pressure is transmitted to the passage 8 leading to the input port 618 in the regulator valve 61. Passages 9 and 10 perform output hydraulic pressure feedback control and are branched from the passage 8 and provided with orifices 654 and 655 respectively. The spool 651 receives the feedback of output hydraulic pressure through the passages 9 and 10 at a land 656 and another land 657 with the pressure receiving area of land 657 larger than that of land 656.

The torque ratio valve 66 shown in FIGS. 2 and 5 is provided with a spool 662 linked to the movable flange 322 of the output pulley 32 through a connecting rod 667. When the displacement amount L of the movable flange 322 is in the range $l_3 \leq L \leq l_4$ (torque ratio T is in the range $t_2 \geq T \geq t_1$), the spool 662 is positioned to the left as shown in FIG. 5A, thereby an input port 664 leading to the output hydraulic pressure feedback passage 9 in the throttle valve 65 is closed and pressure in the detent valve 64 is reduced by communicating the output passage 6 of the torque ratio valve 66 with a drain passage 665. When the displacement amount L of the movable flange 322 is in the range $l_2 \leq L < l_3$ ($t_3 \geq T > t_2$), the spool 662 is positioned in intermediate portion as shown in FIG. 5B, thereby the port 664 leading to the passage 9 communicates with a drain port 666 so as to reduce the pressure in the passage 9. When the displacement amount L is in the range $0 \leq L \leq l_2$ ($t_4 T > t_3$), the spool 662 is positioned to the right as shown in FIG. 5C, thereby a port 663 leading to the passage 1 communicates with the passage 6 which is supplied with the line pressure.

The spool 662 is slidably linked to the movable flange 322 of the output pulley 32, said pulley being in a rotating state. Since movement of the spool 662 in the valve shaft direction is not obstructed by a spring, hydraulic pressure or the like as shown in FIG. 5, transferring the displacement amount of the movable flange is not obstructed, and abrasion is prevented.

Referring to FIG. 2, the shift control mechanism 70 comprises a shift control valve 71 having a spring 711 at one end and a spool 712 receiving the line pressure from an oil chamber 713 at the other end, an orifice 72 disposed in the passage 1 supplying the line pressure to the oil chamber 713, a pressure limiting valve 73 mounted between the orifice 72 and the oil chamber 713, and a solenoid valve 74 controlled by an electric control circuit as hereinafter described and regulating the hydraulic pressure within the oil chamber 713.

When the solenoid valve 74 is operated to the open a drain port 741 and pressure in the oil chamber 713 is exhausted, the spool 712 of the shift control valve 71 is moved to the left in the figure under the action of the spring 711. Thereby the passage 13, leading to the hydraulic servo system 49 acting on the multi-plate clutch 45 of the planetary gear set 40, and the passage 14, leading to the hydraulic servo system 48 acting on the multi-plate brake 42, communicate respectively with the drain ports 714 and 715 and the pressure thereof is exhausted so as to release the multi-plate clutch 45 or the multi-plate brake 42. When the solenoid valve 74 is not operated, the drain port 741 is closed and the spool 712 is positioned at the right in the figure under the line pressure applied to the oil chamber 713. Thereby the passages 3 and 4 communicate respectively with the passages 13 and 14 for engagement of the multi-plate brake 42 or the multi-plate clutch 45. In this embodiment, the shift control valve 71 is provided with oil chambers 717 and 716, to feedback the output hydraulic pressure in the passages 13 and 14, so that a rise in the output pressure is retarded and the multi-plate clutch 45 and the multi-plate brake 42 are prevented from shock upon engagement.

The torque ratio control unit 80 comprises a torque ratio control valve 81, orifices 82 and 83, a downshift solenoid 84, and an upshift solenoid 85. The torque ratio control valve 81 is provided with oil chambers 815 and 816 on both ends to which the line pressure is supplied from the passage 1 through the orifices 82 and 83 respectively, an oil chamber 819 including an input port 817 leading to the passage 1 and varying the opening area according to the amount of displacement of the spool 812, and an output port 818 leading to the hydraulic servo system 313 of the input pulley 31 of the V-belt type continuously variable transmission 30 through the passage 2, a drain port 814 exhausting the oil chamber 819 according to the amount of displacement of the spool 812, and a drain port 813 exhausting the oil chamber 815 according to the amount of displacement of the spool 812. The downshifting solenoid 84 and the upshifting solenoid 85 are connected to the oil chambers 815 and 816 of the torque ratio control valve 81 respectively. Both solenoids 84 and 85 are operated by the output of the electric control circuit as hereinafter described and exhaust the oil chambers 815 and 816 respectively.

Figure 6:
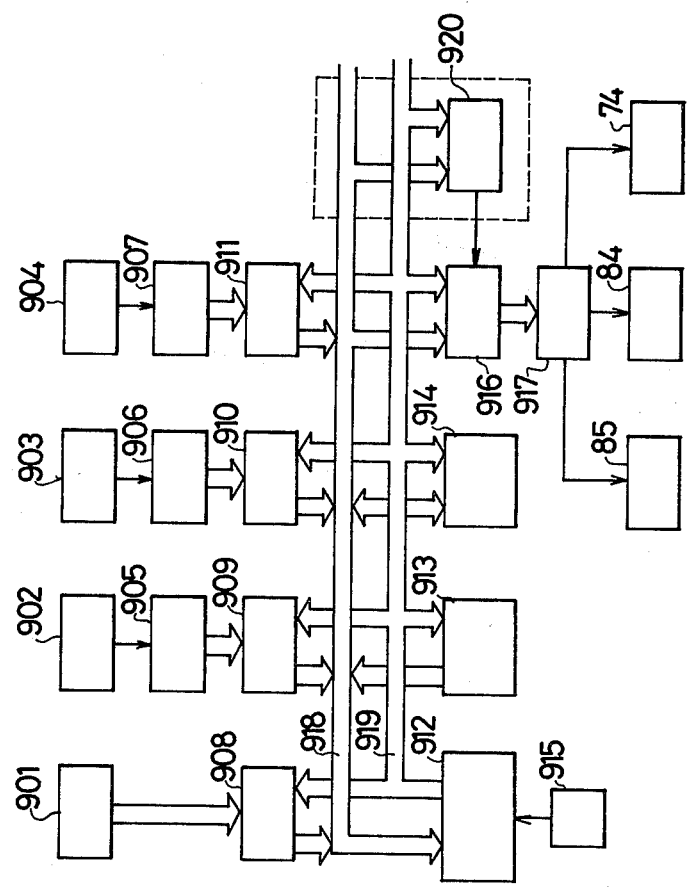
FIG. 6 is a block diagram of an electric control circuit.

FIG. 6 shows the design of the electric control circuit for controlling the solenoid valve 74 of the shift control mechanism 70, the downshift solenoid valve 84 and the upshift solenoid valve 85 of the torque rqtio control device 80 in the hydraulic control circuit shown in FIG. 2.

The electric control circuit comprises a shift lever switch 901 detecting the shift lever positions P, R, N, D or L, a revolution speed sensor 902 detecting the revolution speed of the input pulley 31, a vehicle speed sensor 903, a throttle sensor 904 detecting the throttle opening of the carburetor, a speed detecting and processing circuit 905 converting the output of the revolution speed sensor 902 into a voltage signal, a vehicle speed detecting circuit 906 converting the output of the vehicle speed sensor 903 into a voltage signal, a throttle opening detecting and processing circuit 907 converting the output of the throttle sensor 904 into a voltage signal, input interfaces 908–911 for the sensors 901, 902, 903 and 904, a central processing unit (CPU) 912, a read only memory (ROM) 913 storing the control program for the solenoid valves 74, 84, 85 and data required for their control, a random access memory (RAM) 914 temporarily storing the input data and parameters required for control, a clock 915, an output interface 916, and a solenoid output driver 917 converting the output of the output interface 916 into the operating output for the upshift solenoid 85, the downshift solenoid 84 and the shift control solenoid 74. The input interfaces 908–911, the CPU 912, the ROM 913, the RAM 914 and the output interface 916 communicate with each other through a data path 918 and an address path 919.

The function of the hydraulic regulator 60, comprising in this embodiment the torque ratio valve 66, the detent valve 64, the throttle valve 65, the manual valve 62 and the regulator valve 61 will be now described.

Figure 7:
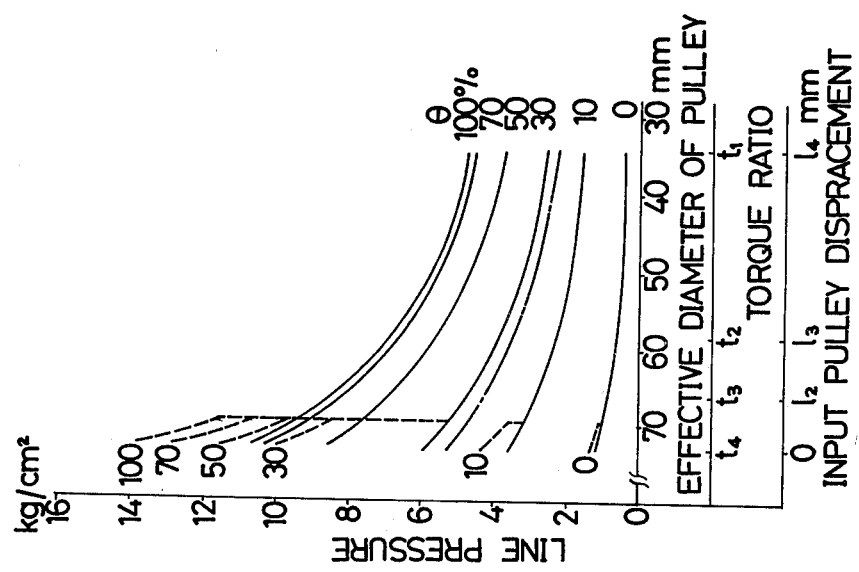
FIG. 7 is a graph showing line pressure as a characteristic of the hydraulic control circuit.

Working fluid in the hydraulic control circuit is supplied from the pump 52 driven by the engine. The high line pressure involves large losses in power from the pump 52. In order to drive a vehicle at low fuel cost, the line pressure supplied to the hydraulic control circuit must be at the minimum value needed. In the case of the continuously variable transmission, the line pressure must be sufficient so that the hydraulic servo systems of the input pulley 31 and the output pulley 32 can deliver the torque without slippage of the V-belt 33. Referring to FIG. 7, solid lines show the minimum values necessary for the line pressure corresponding to variation of the reduction ratio T between the input and output shafts for various throttle openings so that the engine is driven at optimum fuel cost. Upon starting, it is preferable to use the line pressure shown in as dashed lines. The dashed lines correspond to a line pressure that is greater than that the solid lines by approximately 20%, since the engine cannot be driven at optimum fuel cost upon starting. When braking, the line pressure shown as a dash-and-dot line is preferred even when the throttle opening is $\theta = 0$.

In this embodiment, the line pressure as the output of the regulator valve 61 is regulated by the hydraulic regulator 60 depending on the shift positions L, D, N, R, or P of the manual valve 62, the variation of the throttle opening $\theta$ and the reduction ratio between both pulleys, i.e. the reduction ratio between the input and output shafts, as follows:

D position

In the manual valve 62, only the passage 1 has line pressure and pressure in the passages 4 and 5 is exhausted. If the shift control solenoid 74 in the shift control mechanism 70 turns OFF and the line pressure is supplies to the oil chamber 713, the rightward movement of the spool 712 causes the passages 3 and 13 to communicate with each other. Thus, the line pressure supplied to the passage 3 acts on the hydraulic servo system 49 of the forward multi-plate clutch 45 through the passage 13 and the vehicle is ready for forward drive.

(1) The torque ratio T is in the range $t_1 \leq T \leq t_2$

Referring to FIG. 5A, the torque ratio valve 66 closes a port 663 leading to the passage 1, and the passage 6 communicates with a drain port 665 and is exhausted. Thus, the passage 7 is not supplied with the detent pressure (equal to the line pressure) irrespective of the throttle opening $\theta$. Since a port 664 leading to the passage 9 is closed and the spool 651 of the throttle valve 65 receives the feedback pressure not only at the land 656 but also at the land 657, the throttle valve 65 provides throttle pressure corresponding to the throttle opening $\theta$ as shown in characteristic curve (c) in FIG. 8 to the regulator valve plunger 612 of the regulator valve 61 through the passage 8. Then the line pressure provided from the regulator valve 61 is shown in region (f) of FIG. 9 and curve (e) of FIG. 10.

(2) The torque ratio T is in the range $t_2 < T \leq t_3$

Referring to FIG. 5B, the torque ratio valve 66 closes a port 663, and the passage 9 communicates with a drain port 666. Pressure in the passage 6 is exhausted through a port 665. Thus, the detent pressure is not produced in passage 7. Since the passage 9 is exhausted and the feedback pressure is not applied to the land 657 or the spool 651, the throttle pressure increases as shown in characteristic curve (d) of FIG. 8. The line pressure is shown in region (k) of FIG. 9 and curve (g) of FIG. 10

(3) The torque ratio T is in the range $t_3 < T \leq t_4$

Figure 8:
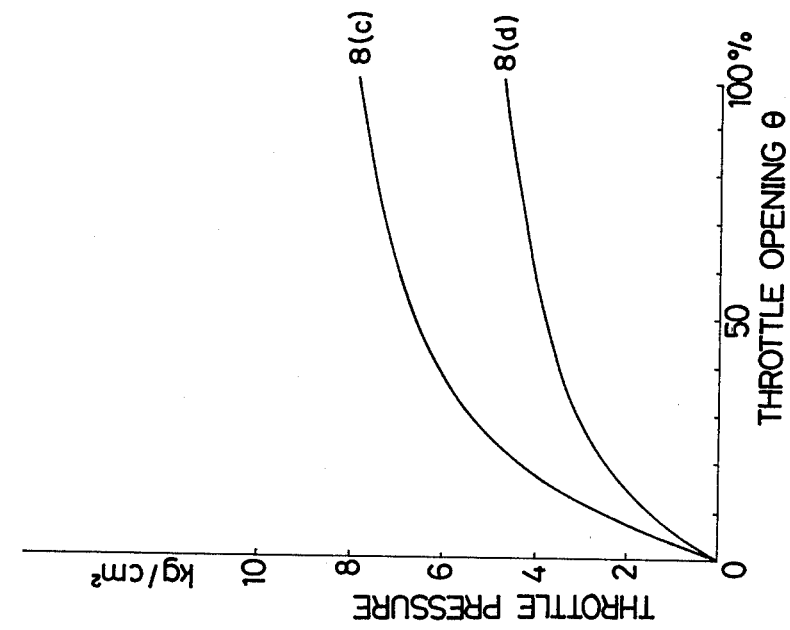
FIG. 8 is a graph showing line pressure as a characteristic of throttle pressure.

Referring to FIG. 5C, the passage 9 is exhausted through a drain port 666 and the throttle pressure is shown in curve (d) of FIG. 8 as in the case (2) above. The port 663 is opened and the passages 1 and 6 communicate with each other. When the throttle opening $\theta$ is in the range $0 \leq \theta \leq \theta_1\%$ and the spool 641 of the detent valve 64 is disposed to the left as shown in FIG. 4A, the passage 6 is closed by the spool 641 and the passage 7 is exhausted through the passage 5 by the manual valve 62. When the throttle opening $\theta$ is in the range $\theta_1\% < \theta \leq 100\%$, the spool 641 is disposed as shown in FIG. 4B and the passages 6 and 7 communicate with each other. The detent pressure is thereby produced in the passage 7. The line pressure is shown in region (1) of FIG. 9 and curve (i) of FIG. 10 and varies stepwise at $\theta = \theta_1\%$.

L position

In the manual valve 62, the passages 5 and 1 communicate with each other. The passages 3 and 4 are arranged in a manner similar to the D position.

(1) The torque ratio T is in the range $t_1 \leq T \leq t_2$

When the throttle opening is in the range $0 \leq \theta \leq \theta_1\%$, the passages 5 and 7 communicate with each other in the detent valve 64, as shown in FIG. 4A. The detent pressure is produced in passage 7 to elevate the throttle plunger and the line pressure becomes high. When $\theta_1\% < \theta \leq 100\%$, the passage 7 is exhausted through the passage 6 and the drain port 665 of the torque ratio valve 66. The detent pressure is not produced, and the throttle pressure is equal to that in D position. Then the line pressure is as shown in curve (k) of FIG. 11.

(2) The torque ratio T is in the range $t_2 < T \leq t_3$

This case is different from (1) immediately above in that the passage 9 communicates with the drain port 666 and is exhausted in the torque ratio valve 66. The throttle pressure provided from the throttle valve 65 through the passage 8 to the regulator valve 61 is increased. The line pressure is shown in curve (j) of FIG. 11.

(3) The torque ratio T is in the range $t_3 < T \leq t_4$

The passages 6 and 1 communicate with each other in the torque ratio valve 66, and the passage 9 is exhausted through the drain port 666. Since the line pressure is supplied to both passages 6 and 5, the detent pressure is provided from the detent valve 64 irrespective of the throttle opening. The regulator valve 61 receives the detent pressure and the throttle pressure in a manner similar to that in (2) immediately above and the line pressure as shown in curve (h) of FIG. 11.

R position

As shown in Table 1, the passages 4 and 5 communicate with the passage 1 in the manual valve 62, and the passage 3 is exhausted. If the shift control solenoid 74 in the shift control mechanism 70 turns OFF and the line pressure is supplied to the oil chamber 713, the leftward movement of the spool 712 causes the passages 4 and 14 to communicate with each other. The line pressure supplied to the passage 4 is supplied through the passage 14 to the hydraulic servo system 48 of the reverse multiplate brake 42, and the vehicle is thereby ready for reverse drive. The line pressure is introduced to the passage 5 and functions in the same way as in the L position. In the R position, the torque ratio T in the V-belt type continuously variable transmission 30 is set at the maximum torque ratio $T = t_4$. Therefore, a high reduction ratio need not be achieved in the planetary gear set 40. In this embodiment, control of the line pressure, as in the case of the L position is possible even when the torque ratio T is varied in the R position.

P position and N position

The passages 3, 4 and 5 are exhausted in the manual valve 62. Since the passage 5 is exhausted, the line pressure provided by the regulator valve 61 is the same as that in the D position.

Figure 10:
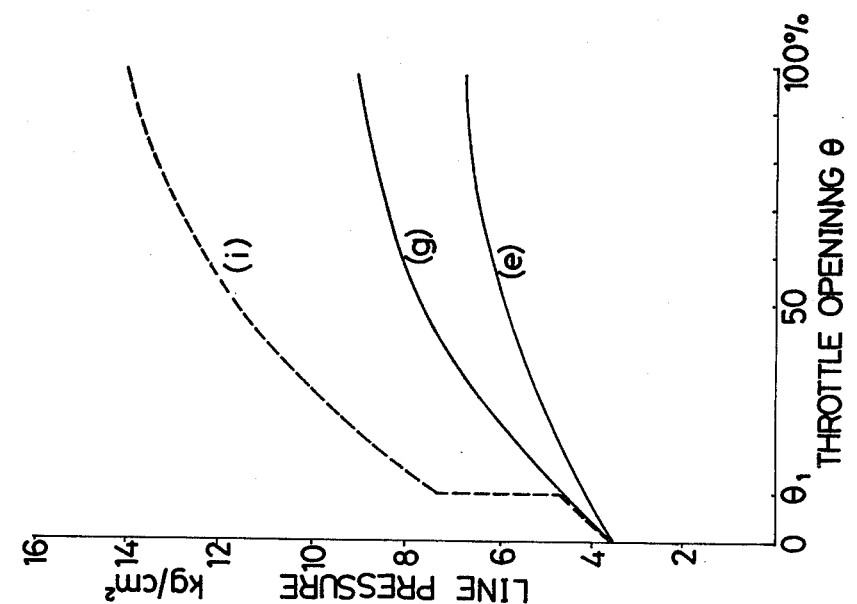

When the manual valve 62 is shifted to D, N or P position, the line pressure in the torque ratio range of $t_3 < T \leq t_4$ is set to lower values at the throttle openings less than $\theta_1\%$ as shown in characteristic curve (i) of FIG. 10. If the line pressure were set to higher levels during running, maintaining the line pressure would become difficult since much oil leakage occurs at various portions in the hydraulic circuit at high oil temperature. Moreover, a decrease in the amount of oil supplied to the oil cooler would further raise the oil temperature and could cause problems.

Figure 9:
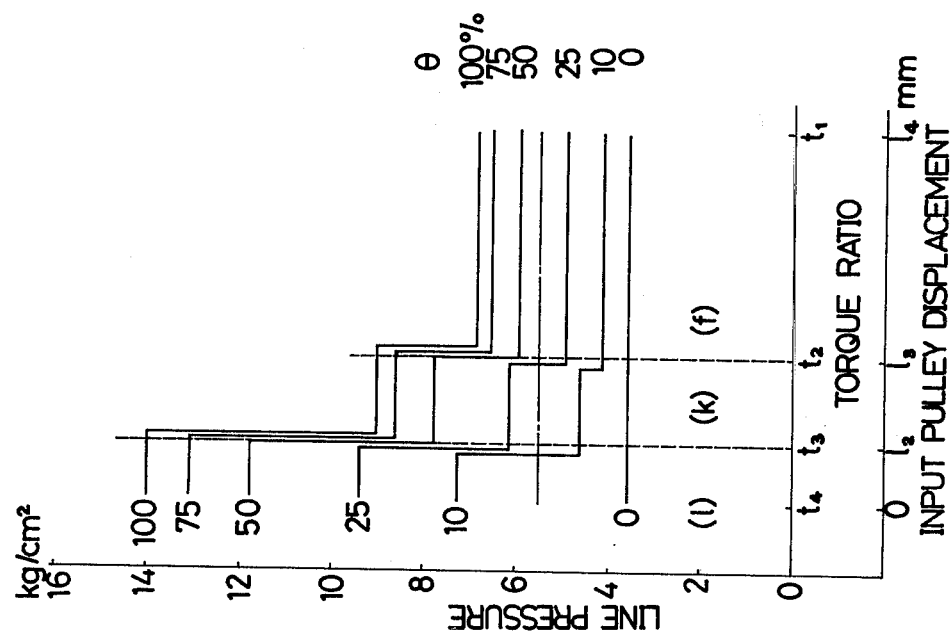
FIGS. 9–11 are graphs showing line pressure as a characteristic of a hydraulic regulator according to the present invention.
Figure 11:
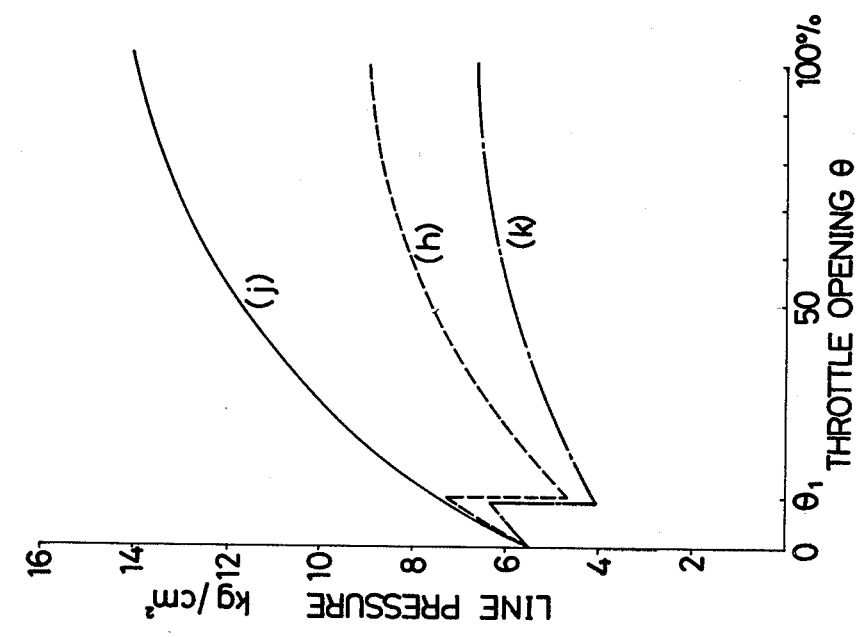

When the manual valve 62 is shifted to L or R position, the line pressure in the range of $t_1 \leq T \leq t_2$ is set to higher values at the throttle openings less than $\theta_1\%$ as shown in curves (h) and (k) of FIG. 11, since relatively high hydraulic pressure is required during engine braking even at the low throttle openings. The hydraulic pressure required in this condition is shown in the dash-and-dot line of FIG. 7. Referring to FIG. 9, if the line pressure is close to the required value shown in FIG. 7, the power loss in the pump 52 is reduced and efficiency is improved in fuel cost and rate of fuel dissipation.

The operation of the electric control circuit 90, the shift control mechanism 70 controlled by the circuit 90 and the torque ratio control device 80 of the present invention will now be described by referring to the program flowcharts shown in FIGS. 18–27.

In this embodiment, revolution speed N' of the input pulley is controlled by the electric control circuit 90 so that fuel cost is optimized in all degrees of the throttle opening.

In general, a vehicle engine is driven according to the optimum-fuel-cost power curve shown as a dashed line in FIG. 12. In FIG. 12, the abscissa represents the engine revolution speed (rpm) and the ordinate represents the output shaft torque (Kg·m). The rate of fuel consumption Q (gram/Pferde Starke·hour) and the power P (Pferde Starke) at any point A are given by the constant fuel consumption curve in solid line and the constant horsepower curve in dash-and dot line respectively. The fuel consumption per hour at the point A is given by:

$$S = Q \times P \ (g/h).$$

Figure 16:
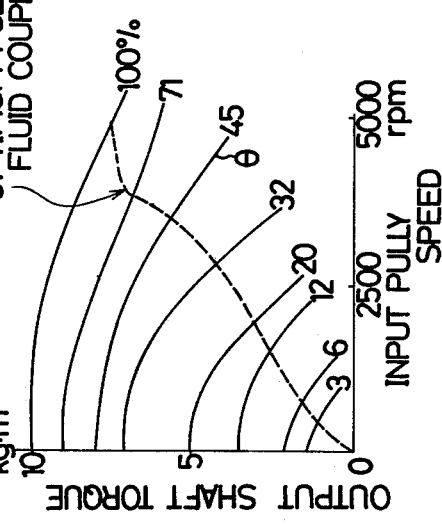
FIG. 16 is a graph showing the optimum-fuel-cost fluid coupling output curve.
Figure 17:
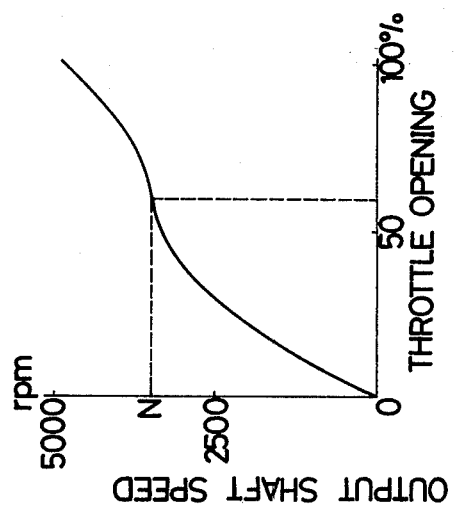
FIG. 17 is a graph showing the optimum-fuel-cost fluid coupling as a characteristic of output revolution speed.

The fuel consumption amount S per hour is calculated for each point along constant horsepower curves to determine the point with minimum value of S in each constant horsepower curve. By connecting the points with minimum S on each constant horsepower curve, the optimum-fuel-cost power curve is obtained which shows the engine driving condition with optimum fuel consumption for every horsepower. In this embodiment where the engine 100 is associated with the fluid coupling 21, the fluid coupling output curve with optimum fuel cost shown in FIG. 16 is obtained in a manner to the above described procedure from the engine output characteristic curve with respect to the throttle opening shown in FIG. 13, from the fluid coupling characteristic curve shown in FIG. 14 and from the constant fuel consumption rate of the engine in FIG. 15. FIG. 17 shows the correlation between the throttle opening and the fluid coupling output revolution speed obtained from the fluid coupling output curve with optimum fuel cost in FIG. 16. The fluid coupling output revolution speed in this figure is used as the input pulley revolution speed in this embodiment.

In the continuously variable transmission of this embodiment the reduction ratio between the input pulley 31 and the output pulley 32 is determined by the input pulley revolution speed with optimum fuel cost given by the above procedure and the actual input pulley revolution speed following reduction.

The torque ratio control device 80 is controlled by comparing the input pulley revolution speed with optimum fuel cost given in FIG. 17 with the actual input pulley revolution speed and regulating the reduction ratio between the input and output pulleys using both solenoid valves 84 and 85 in the control device 80, so that the actual revolution speed coincides with the revolution speed for optimum fuel cost.

Figure 18:
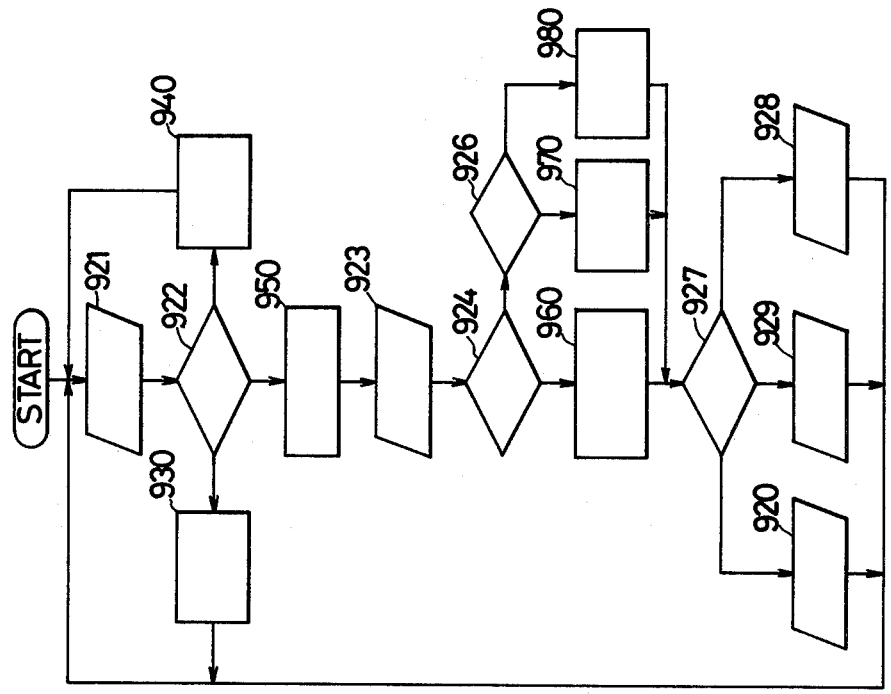
Figure 20:
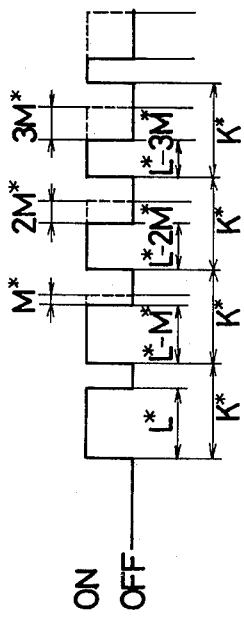
FIG. 20 is a wave form chart illustrating duty control.
Figure 23:
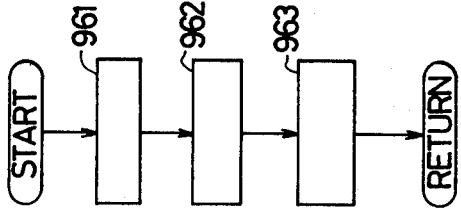
Figure 19:
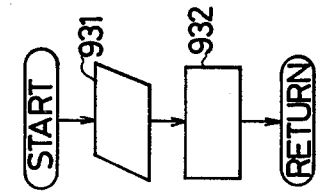
Figure 21:
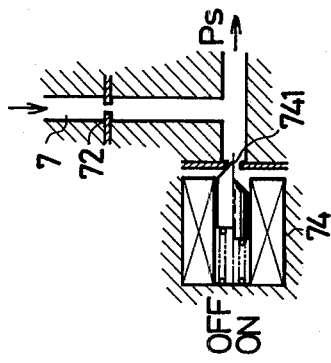
FIG. 21 is a diagram illustrating operation of an electromagnetic solenoid valve of a shift control mechanism.

FIG. 18 shows a flowchart of the entire control system for the input pulley revolution speed. The throttle sensor 904 reads out the throttle opening $\theta$ at unit 921, and the shift lever switch 901 determines the shift lever position at unit 922. When the shift lever is verified to be in P or N position, subroutine 930 for processing the P or N position shown in FIG. 19 acts. The subroutine 930 turns OFF both solenoid valves 84 and 85 at unit 931 and the RAM stores the state of the shift lever in P or N position at unit 932. The input pulley 31 is thereby in a neutral state. When the shift lever is changed from P or N position to R position, or N position is changed to D position, shock control processing is carried out at units 940 and 950 in order to retard the shock involved in P, N-R shift and N-D shift respectively. The shock control processing is effected by applying and decreasing gradually a pulse train as shown in FIG. 20, a pulse width in each period K* being represented by L*-nM* (n=1,2,3, ... ) to the shift control solenoid value 74 of the shift control mechanism 70 shown in FIG. 21 (hereinafter referred to as "duty control"). When the shift control solenoid 74 is subjected to duty control as above described, the oil chamber 713 of the shift control valve 71 is supplied with hydraulic pressure Ps regulated in accordance with the duty control.

The shift control mechanism 70 regulates the timing of intake and exhaust of hydraulic pressure to the hydraulic servo systems 48 and 49 of the planetary gear set 40 by operation of the solenoid valve 74 in response to the output of the electric control circuit 90 so as to eliminate shock during the shift. The control mechanism 70 also holds the upper limit of the hydraulic pressure supplied to the hydraulic servo system 48 and 49 below a prescribed value so as to limit the engaging pressure of the clutch and brake.

Figure 28:
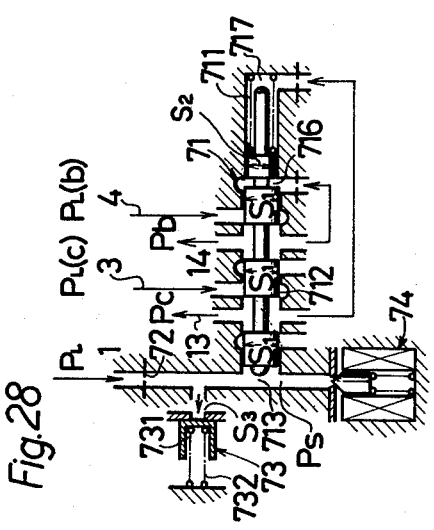
FIG. 28 is a diagram illustrating operation of the shift control mechanism.

Referring to FIG. 28, assuming that pressure receiving areas of the lands on a spool 712 of the shift control valve 71 are represented by $S_1$, $S_1$, $S_1$, $S_2$ in sequence from the left, the force of spring 711 is represented by Fs1, and the hydraulic pressure in oil chamber 713 is represented by Ps, the hydraulic servo system 49 of the multi-plate clutch 45 engaged in forward drive and the hydraulic servo system 48 of the multi-plate brake 42 engaged in reverse drive are supplied respectively with hydraulic pressure Pc and Pb calculated from the hydraulic balance equations (1) and (2) as follows:

Forward: (1)

$$Ps \times S_1 = Pc \times S_2 + Fs_1$$

$$Pc = \frac{S_1}{S_2} \times Ps - \frac{Fs_1}{S_2}$$

Reverse: (2)

$$Ps \times S_1 = Pb \times (S_1 - S_2) + Fs_1$$

$$Pb = \frac{S_1}{S_1 - S_2} \times Ps - \frac{Fs_1}{S_1 - S_2}$$

Assuming that the pressure receiving area of the valve body 731 inserted in the pressure limiting valve 73 is represented by $S_3$, and the force of a spring 732 behind the valve body 731 is represented by Fs2, the pressure limiting valve 73 is operated by P limit, the maximum value of Ps, calculated from the hydraulic balance equation (3) as follows:

$$P \text{ limit} \times S_3 = Fs_2 \tag{3}$$

$$P \text{ limit} = \frac{Fs_2}{S_3}$$

Pc and Pb are restricted to the maximum values Pc limit and Pb limit respectively according to equations (4) and (5) as follows:

Forward: (4)

$$Pc \text{ limit} = \frac{S_1}{S_2} \times P \text{ limit} - \frac{Fs_1}{S_2}$$

Reverse: (5)

$$Pb \text{ limit} = \frac{S_1}{S_1 - S_2} \times P \text{ limit} - \frac{Fs_1}{S_1 - S_2}$$

Figure 22:
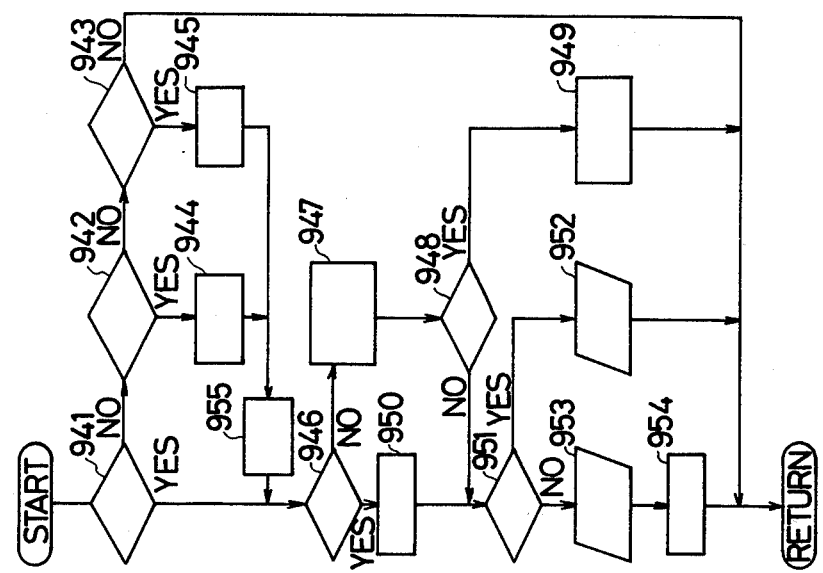

FIG. 22 shows a program flowchart in the case of duty control by parameters K*, L*, M* shown in the wave form chart of FIG. 20. The flag decision whether shock control is processed or not is determined at unit 941. If the shock control is to be processed, the processing continues. If not processed, any change in the shift lever switch 901 is determined at units 942 and 943. A change from P or N position to R position is determined at 942; a change from N position to D position is determined at 943. If a change is detected, corresponding parameters K*, L*, M* are set at unit 944 or 945, and designating the ready state for shock control processing is set to ON at unit 955. If no change is detected, process is returned and the shift shock control is not effected. Parameter K verifying the end of one period K* of the shock control processing is determined at unit 946. If the value of K is not positive, K is set to K*, L* to L*-M*, and L to L* at unit 947. Whether L=0 or not is determined at unit 948. If L≦0, unit 949 is set to off. The state that L≦0 and flat set to OFF means the end of shock control processing. If parameter K verifying the end of oen period K* is determined positive at unit 946, K-1 is set to K at unit 950. When K is set at unit 950 and L=0 is determined "ON" at unit 948, parameter L verifying the end of ON time duration in one period K is determined at unit 951. If L=0, the solenoid valve 74 generates an OFF command at unit 952. If L is not zero, the solenoid valve 74 generates on ON command at unit 953 and L-1 is set to L at unit 954 thereby process is returned. Similar shock control may be processed using the programmable timer 920 shown in FIG. 6.

Referring to FIG. 18, following the N-D shock control processing at unit 950, the input pulley revolution speed sensor 902 detects the actual input pulley revolution speed N' at unit 923. Whether the throttle opening θ is zero or not is determined at unit 924. If θ≠0, data for the input pulley revolution speed N* at optimum fuel corresponding to the throttle opening θ in FIG. 17, having previously been stored in the ROM 913, is then set at unit 960. Referring to the subroutine shown in FIG. 23, the store address of data for N* is set at unit 961, and data for N* is read out from the set address at unit 962, and then the data storing RAM 914 temporarily stores the read data of N* at unit 963.

The actual input pulley revolution speed N' is compared with the optimum-fuel-cost input pulley revolution speed N* at unit 927. If N<N*, the operating command for the downshift solenoid valve 84 is generated at unit 928; if N'>N*, the operating command for the upshift solenoid valve 85 is generated at 929; and if N'=N*, an OFF command for both solenoid valves 84 and 85 is generated at 920.

When θ=0, that is, the throttle is fully closed, the decision of whether the shift lever is set to D position or L position is made at unit 926 in order to determine the necessity for engine braking operation. If necessary, the engine brake control is effected at unit 970 or 980.

Referring to FIG. 24 showing a program for engine brake control of D position effected at unit 970, the vehicle speed sensor 903 detects the vehicle speed V at unit 971 and the acceleration α is calculated at unit 972. Whether the acceleration α is equal to the acceleration A adapted for the vehicle speed is determined at unit 973. If α>A, N* is set to a value larger than that of N' so as to effect DOWN-SHIFT control at unit 974 and then process is returned. If α≦A, the optimum-fuel-cost input pulley revolution speed N* corresponding to the throttling opening θ is set at unit 975 and then process is returned. The relation between the vehicle speed and the adapted acceleration A is determined by experiment or calculation for different vehicles and is illustrated in a FIG. 26.

Referring to FIG. 25 showing the engine brake control of the L position effected at unit 980, the vehicle speed V is detected at unit 981 and then the torque ratio T is calculated from the vehicle speed V and the input pulley revolution speed N according to the following equation at unit 982.

$$T = \frac{N}{V} \times k$$

wherein k is a constant defined by the reduction ratio of the gear mechanism 23 within the transmission, the final reduction ratio of the vehicle, the radius of the tires and the like. The decision of whether the torque ratio is larger than the torque ratio T* adapted for secure and proper engine braking corresponding to vehicle speed V is effected at unit 983. If T<T*, N* is set to a value larger than that of N' at unit 984 so as to effect DOWN SHIFT control and then process is returned. If T≧T*, N* is set to a value equal to that of N' and then process is returned. The torque ratio T* adapted for secure and proper engine brake corresponding to the vehicle speed is determined by experiment or calculation for different vehicles and is illustrated in FIG. 27.

Figure 29:
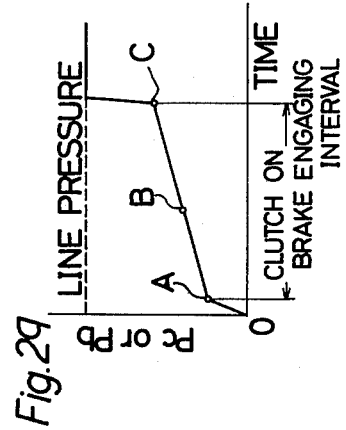
FIG. 29 is a graph showing characteristics of hydraulic pressure supplied to the hydraulic servo systems of the input and output pulleys.
Figure 30:
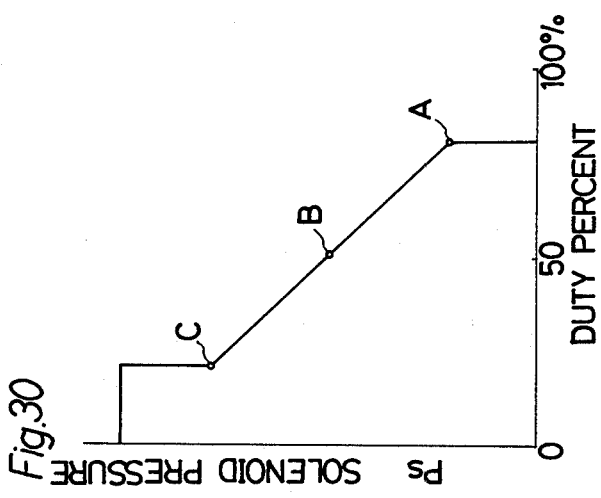
FIG. 30 is a graph showing characteristics of solenoid pressure Ps.

In order to retard the shock involved in engagement during N-D shift or N-R shift, fluid pressure Pb or Pc supplied to the hydraulic servo system 48 or 49 is controlled in accordance with the fluid pressure characteristic curve shown in FIG. 29, so that the engagement of the multi-plate clutch 45 or the multi-plate brake 42 is completed in the time interval between A and C in the figure. FIG. 30 shows the relation between the duty (%) of the solenoid valve 74 to control fluid pressure supplied to the hydraulic servo system 48 or 49 and the solenoid pressure Ps produced in the oil chamber 713 by working the solenoid valve 74. The duty (%) is given by following equation:

$$\text{duty } (\%) = \frac{\text{solenoid ON duration in one period}}{\text{solenoid working period}} \times 100 \, (\%)$$

Figure 31:
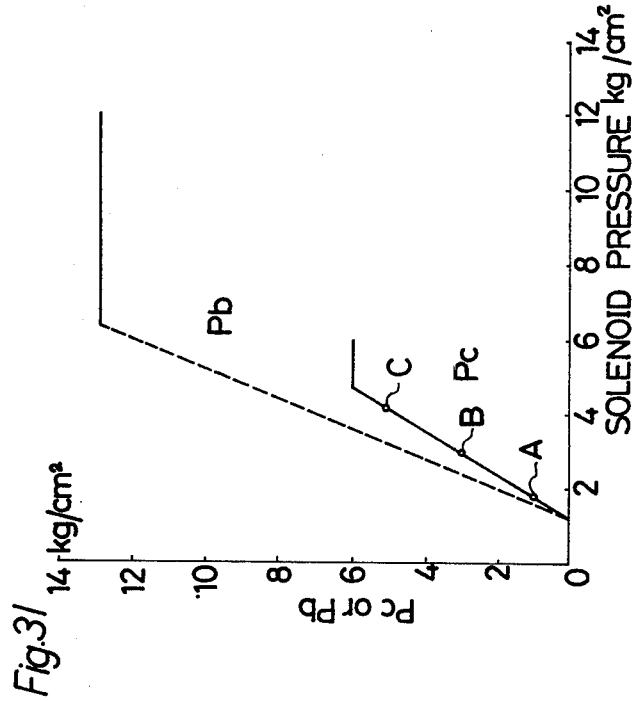
FIG. 31 is a graph showing characteristics of output hydraulic pressure of the shift control valve.

The solenoid pressure Ps in FIG. 30 is amplified by the shift control valve 71, thereby providing the fluid pressure Pb or Pc supplied to the hydraulic servo system 48 or 49 shown in FIG. 31.

Operation of the torque ratio control unit 80 according to the present invention will now be described by referring to FIG. 32.

Constant speed drive

Figure 32A:
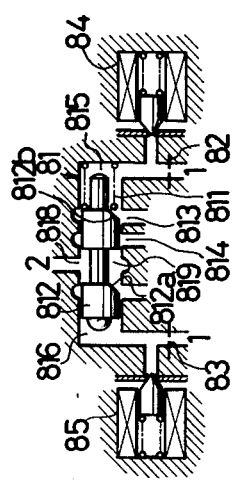
FIG. 32 is a diagram illustrating operation of a torque ratio control device.

The solenoid valves 84 and 85 which are controlled by the electric control circuit 90 are turned OFF as shown in FIG. 32A and the spool 812 assumes an intermediate position. The fluid pressure $P_1$ in the oil chamber 816 becomws the line pressure, and, if the spool 812 is to the right in the figure, the fluid pressure $P_2$ in the oil chamber 815 also becomes the line pressure. However, the spool 812 is urged to the left by pushing force $P_3$ of the spring 811. When the spool 812 is moved to the left and the oil chamber 815 communicates with the drain port 813, $P_2$ is exhausted and the spool 812 is urged to the right by fluid pressure $P_1$ in the oil chamber 816. If the spool 812 is moved to the right, the drain port 813 is closed. If a flat surface 812b with a beveled edge is arranged at the land edge between the drain port 813 and the spool 812 as shown in FIG. 32, the spool 812 can be stabilized at the intermediate balance point as shown in FIG. 32A. Since the passage 2 then is closed, fluid pressure in the hydraulic servo system 313 of the input pulley 31 is pushed by the line pressure in the hydraulic servo system 323 of the output pulley 32 through the V-belt 323, thereby fluid pressure in the hydraulic servo systems 313 and 323 is balanced. In reality, however, oil leakage exists at the passage 2 and the input pulley 31 gradually expands and increases the torque ratio T. In order to compensate for the oil leakage at the passage 2, the drain port 814 is closed in the balanced state of the spool 812 as shown in FIG. 32A and a flat surface 812a with a beveled edge is provided at the land edge of the spool 812.

Figure 34:
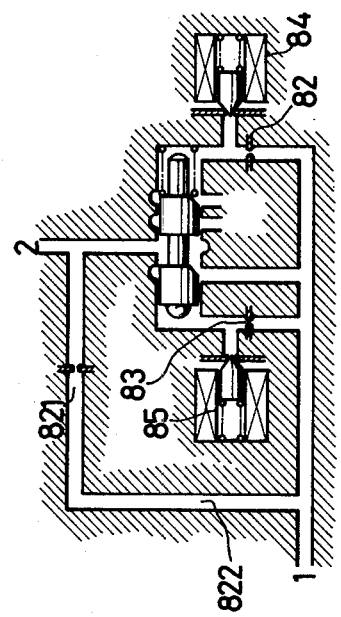
FIG. 34 is a diagram showing another embodiment of the shift control mechanism.

Referring to FIG. 34, in place of the surface 812a the passages 1 and 2 may be communicated by a passage 822 having an orifice 821 in order to attain a similar result.

UP-SHIFT

Figure 32B:
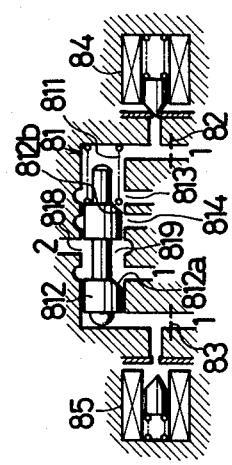

The solenoid valve 85 is turned ON by the electric control circuit 90 as shown in FIG. 32B. The oil chamber 816 is exhausted and the spool 812 moves to the left in the figure. As the spool 812 moves, the oil chamber 815 is also exhausted through the drain port 813. However, the spool 812 is urged to the left end by the spring 811.

Since the line pressure in the passage 1 is supplied to the passage 2 through the port 818, fluid pressure in the hydraulic servo system 313 rises and the input pulley 31 contracts so as to decrease the torque ratio T. By controlling the ON time duration of the solenoid valve 85 for an appropriate duration of time, the torque ratio is reduced by the required amount and UP-SHIFT is effected.

DOWN-SHIFT

Figure 32C:
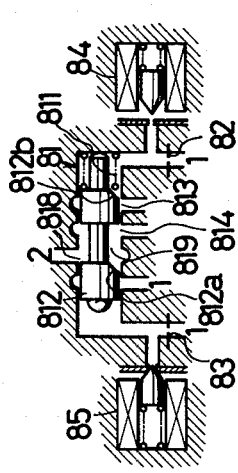

The solenoid valve 84 is turned ON by the electric control circuit 90 as shown in FIG. 32C, thereby exhausting the oil chamber 815. The spool 812 is moved to the right in the figure by the line pressure in the oil chamber 816, and the passage 2 is exhausted through the drain port 814. The input pulley 31 expands so as to increase the torque ratio T. By controlling the ON time duration of the solenoid valve 84 in this manner, the torque ratio is increased and DOWN-SHIFT is effected.

Figure 33:
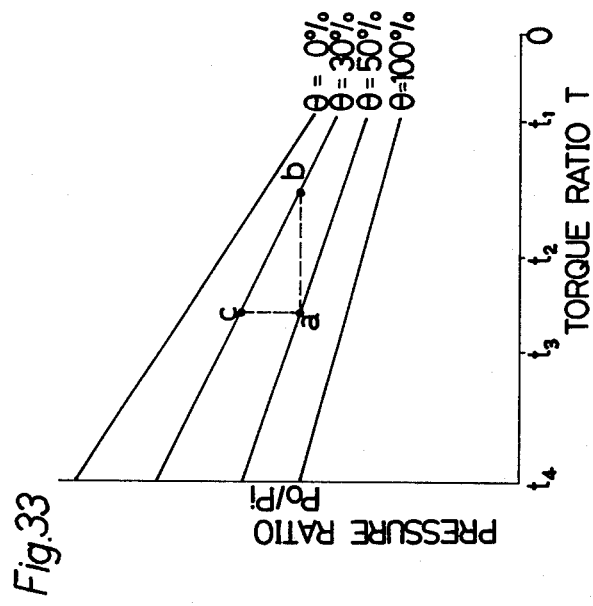
FIG. 33 is a graph showing the relation between the torque ratio of input and output shafts in a V-belt type continuously variable transmission and the pressure ratio of the input and output hydraulic servo systems.

The hydraulic servo system 313 of the input (driving) pulley 31 is supplied with the output fluid pressure in the torque ratio control valve 81, while the hydraulic servo system 323 of the output (driven) pulley 32 is supplied with the line pressure. If Pi is the fluid pressure in the input hydraulic servo system 313, and Po is the fluid pressure in the output hydraulic servo system 323, the relation between the pressure ratio Po/Pi and the torque ratio T is shown in the graph of FIG. 33. For example, assume the state represented by point a (throttle opening $\theta=50\%$, torque ratio T=1.5) is changed to the state where $\theta=30\%$ by releasing the acceleration. If the pressure ratio Po/Pi is not changed, the working point is transferred to the point b with the torque ratio T=0.87. On the other hand, if the torque ratio T=1.5 is not changed, the value of Po/Pi is increased by the torque ratio control mechanism 80 controlling the input pulley and the working point is transferred to the point c. Thus, any value of the torque ratio can be set correspondingly to the load condition by controlling the value of Po/Pi as required.

What is claimed is:

1. A torque ratio control device in a V-belt type continuously variable transmission for vehicles having input and output pulleys mounted respectively on an input and an output shaft and having variable effective diameters wherein the torque ratio between the input and output shafts is continuously controlled by adjusting said effective diameter of each pulley by hydraulic servo means, comprising:

an electric control circuit which inputs accelerator and vehicle running condition signals such as the input pulley revolution speed, and outputs signals controlling said effective diameter of the input side pulley, and a torque ratio control device comprising:
a primary hydraulic servo means arranged on said input side pulley,
a second output side hydraulic servo arranged on said output side pulley,
a spool,
at least one spring means giving power to said spool in one direction,
a primary hydraulic passage connecting to the one edge of said spool,
a secondary hydraulic passage connecting to the other edge of said spool,
a tertiary hydraulic passage connecting a hydraulic pressure source with said spool,
an exhaust port discharging a hydraulic pressure of said primary hydraulic servo means,
a primary orifice means arranged in said primary hydraulic passage,
a primary solenoid valve means arranged in the spool side of said primary hydraulic passage through said primary orifice means and controlled by said electric control circuit, and
a secondary solenoid valve means arranged in the spool side of a secondary hydraulic passage through a secondary orifice means and controlled by said electric control circuit, wherein the torque ratio pressure control device discharges a hydraulic pressure from said secondary hydraulic passage when said spool is given power in one direction by said spring means, wherein said spool is controlled in a primary position connecting said primary hydraulic servo with said tertiary hydraulic passage in connection with hydraulic pressure, a secondary position connecting said primary hydraulic servo with an exhaust port, and a tertiary position closing the connection between the primary hydraulic servo and the tertiery hydraulic passage and closing the connection between the primary hydraulic servo and the exhaust port, said primary and secondary hydraulic passages controlled by said two solenoid valve means, said secondary hydraulic servo means always being connected to a hydraulic pressure source and controlling the torque ratio continuously by adjusting the hydraulic pressure supplied to said primary hydraulic servo means, depending on vehicle running conditions.

2. The torque ratio control device in a V-belt type continuously variable transmission for vehicles in accordance with claim 1, wherein said tertiary hydraulic passage is connected to said primary hydraulic servo means through a orifice means when said spool is fixed in said tertiary position, and oil leakage in the hydraulic pressure passage to said primary hydraulic servo means is replaced.

3. The torque ratio control device in a V-belt type continuously variable transmission for vehicles in accordance with claim 2, wherein said orifice means is a hydraulic passage comprising a plane part arranged on the edge of said spool and a tertiary valve body.

4. The torque ratio control device in a V-belt type continuously variable transmission for vehicles in accordance with claim 1, wherein said control device has a fourth hydraulic passage connecting a hydraulic pressure source with said primary hydraulic servo means, and a tertiary orifice means arranged in said fourth hydraulic passage.

5. The torque ratio control device in a V-belt type continuously variable transmission for vehicles in accordance with claim 1, wherein said primary hydraulic passage is connected to said secondary hydraulic passage with said primary and secondary orifice means.

6. The torque ratio control device in a V-belt type continuously variable transmission for vehicles in accordance with claim 5, wherein said primary and secondary hydraulic passages are connected to a hydraulic pressure source through said primary and secondary orifices means.

* * * * *

UNITED STATES PATENT AND TRADEMARK OFFICE
CERTIFICATE OF CORRECTION

PATENT NO. : 4,459,879

DATED : July 17, 1984

INVENTOR(S) : Nobuaki, Miki
Shoji Yokoyama

It is certified that error appears in the above-identified patent and that said Letters Patent is hereby corrected as shown below:

On the title page add /73/ Assignee:

Aisin-Warner Kabushiki Kaisha
No. 10, Takane,
Fujii - Cho, Anjo
Aichi Prefecture
Japan Signed and Sealed this Fifth Day of March 1985

[SEAL]

Attest:

DONALD J. QUIGG

Attesting Officer   Acting Commissioner of Patents and Trademarks